United States Patent
Lee et al.

(10) Patent No.: US 10,790,687 B2
(45) Date of Patent: Sep. 29, 2020

(54) POWER SUPPLY CONTROL UNIT, CONTROLLING MODULE, CONTROLLING DEVICE AND CONTROLLING METHOD OF THE SAME

(71) Applicant: GENESYS LOGIC, INC., New Taipei (TW)

(72) Inventors: Wei-te Lee, New Taipei (TW); Chien-kang Cheng, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 486 days.

(21) Appl. No.: 15/586,309

(22) Filed: May 4, 2017

(65) Prior Publication Data

US 2017/0324241 A1 Nov. 9, 2017

(30) Foreign Application Priority Data

May 5, 2016 (TW) .............................. 105114029 A

(51) Int. Cl.
*H02J 7/00* (2006.01)
*G08C 19/02* (2006.01)
*H02M 1/00* (2006.01)

(52) U.S. Cl.
CPC ............ *H02J 7/0047* (2013.01); *G08C 19/02* (2013.01); *H02J 7/0021* (2013.01); *H02J 7/0026* (2013.01); *H02J 7/00* (2013.01); *H02J 7/0027* (2013.01); *H02J 2207/20* (2020.01); *H02M 2001/008* (2013.01)

(58) Field of Classification Search
CPC ................... G08C 19/02–10; H02M 2001/008
See application file for complete search history.

(56) References Cited

U.S. PATENT DOCUMENTS

| 7,994,660 B2 | 8/2011 | Cioaca et al. |
| 8,786,268 B2 | 7/2014 | Li |
| 2003/0025401 A1* | 2/2003 | Popescu-Stanesti ........................ H02J 7/0006 307/149 |
| 2004/0075600 A1* | 4/2004 | Vera ........................ H02J 1/102 341/166 |

(Continued)

FOREIGN PATENT DOCUMENTS

| CN | 1954469 | 4/2007 |
| CN | 101061668 A | 10/2007 |

(Continued)

*Primary Examiner* — Rexford N Barnie
*Assistant Examiner* — David A Shiao
(74) *Attorney, Agent, or Firm* — Mark M. Friedman

(57) ABSTRACT

The present invention provides a power supply controlling module, which is suitable for a power supply controlling device. The power supply controlling device comprises a power source and a plurality of connecting ports. The power supply controlling module comprises a plurality of control units and a resistance. Each of the control units respectively connects with each of the connecting ports. The control units comprise a first control unit and at least one second control unit. The resistance electrically connects with the control units. The first control unit comprises a detecting circuit and a first control circuit, which respectively connects with the resistance. Each of the at least one second control unit comprises a second control circuit, which respectively connects with the resistance.

7 Claims, 7 Drawing Sheets

(56) References Cited

U.S. PATENT DOCUMENTS

| | | | |
|---|---|---|---|
| 2005/0225292 A1* | 10/2005 | Damlamian | H02J 7/0003 |
| | | | 320/128 |
| 2006/0112285 A1 | 5/2006 | Stineman, Jr. | |
| 2007/0229041 A1 | 10/2007 | Oki | |
| 2009/0177906 A1* | 7/2009 | Paniagua, Jr. | G06F 1/26 |
| | | | 713/340 |
| 2011/0179291 A1* | 7/2011 | Weng | G06F 1/26 |
| | | | 713/300 |
| 2011/0278923 A1* | 11/2011 | Pance | H01R 13/7039 |
| | | | 307/31 |
| 2014/0009977 A1 | 1/2014 | Huang et al. | |
| 2014/0292070 A1* | 10/2014 | Poh | H04L 12/40045 |
| | | | 307/4 |
| 2017/0222436 A1* | 8/2017 | Wendt | H02J 1/08 |

FOREIGN PATENT DOCUMENTS

| | | | | |
|---|---|---|---|---|
| GB | 2437622 A | * | 10/2007 | H02J 7/0063 |
| TW | 336550 | | 1/2011 | |
| TW | 462454 | | 11/2014 | |
| TW | 201501443 | | 1/2015 | |

* cited by examiner

| $V_{RP}$ | >2.5 V | 1.5-2.5 V | 0.75-1.5 V | 0.375-0.75 V | 0.125-0.375 V | <0.125 V |
|---|---|---|---|---|---|---|
| Rp | Open circuit | 200K Ω | 100K Ω | 50K Ω | 25K Ω | Short circuit |

FIG. 2

| Maximum Power Value | 24 W | 36 W | 48 W | 60 W |
|---|---|---|---|---|
| Rp | 200K Ω | 100K Ω | 50K Ω | 25K Ω |

| Output voltage(VBUS) | Output current | Output power | iSRC(R=200 KΩ) | iSRC(R=100 KΩ) | iSRC(R=50K Ω) | iSRC(R=25K Ω) |
|---|---|---|---|---|---|---|
| 20V | 1.2A | 24W | 5 µA | 10 µA | 20 µA | 40 µA |
| 12V | 2A | 24W | 5 µA | 10 µA | 20 µA | 40 µA |
| 9V | 2A | 18W | 3.75 µA | 7.5 µA | 15 µA | 30 µA |
| 5V | 2.4A | 12W | 2.5 µA | 5 µA | 10 µA | 20 µA |

| $V_{Rp}$ | Power Consumption Value |
|---|---|
| 2.5 V | 60 W |
| 2.25 V | 54 W |
| 2.0 V | 48 W |
| 1.75 V | 42 W |
| 1.5 V | 36 W |
| 1.25 V | 30 W |
| 1.0 V | 24 W |
| 0.75 V | 18 W |
| 0.5 V | 12 W |
| 0.25 V | 6 W |
| 0 V | 0 W |

FIG. 5

POWER SUPPLY CONTROL UNIT, CONTROLLING MODULE, CONTROLLING DEVICE AND CONTROLLING METHOD OF THE SAME

CROSS-REFERENCE TO RELATED APPLICATIONS

This application claims the benefits of Taiwan Patent Application No. 105114029 filed on May 5, 2016, the contents of which are incorporated herein by reference in their entirety.

BACKGROUND OF THE INVENTION

Field of Invention

The present invention relates to a field of power supplies, and more particularly to a power supply controlling unit, a controlling module, device, and controlling method of the same.

Description of Prior Art

In the conventional art, people are used to using various electronic products at the same time, so a power supply device with multi connecting ports are highly valuable. Take the universal serial bus (USB) for example, the USB plug uses 5 V voltage. Moreover, with the technological development of the power supply device, the current charging specifications further comprise quick charge (QC) 3.0, pump express (PE) 2.0, standard fast charger protocol (SFCP), high fast charger protocol (HFCP), type C 3.0 A, and auto 2.4 A, each charging specification may use different voltage and current, However, a total supply power of each power supply device is fixed, when the power supply device connects with multi electronic products with different charging specifications, the power supply device is likely to not be able to provide enough power, to make the electronic products charge properly. Hence, when the user connects the electronic product with the power supply device, the user is unable to confirm whether the charging port can normally provide power.

Hence, it is necessary to provide a power supply controlling unit, a controlling module, device, and controlling method of the same, to make the power supply device effectively monitor the power supply status of each charging connecting port, to solve the power supply controlling issue of the power supply device.

SUMMARY OF THE INVENTION

In order to solve the technical issue, an objective of the present invention is to provide a power supply controlling device and controlling method of the same, for example, by hardware means, to make the circuit directly and selectively setup the power supply to the control unit according to a maximum power value of the power supply controlling device and a single power consumption value of each of the control units, which is derived by a method of potential difference.

In order to achieve the above objective, the present invention provides a power supply controlling module for a power supply controlling device. The power supply controlling device comprises a power source and a plurality of connecting ports. The power supply controlling module comprises a plurality of control units and a resistance. Each of the control units respectively connects with each of the connecting ports. The control units comprise a first control unit and at least one second control unit. The resistance electrically connects with the control units. The first control unit comprises a detecting circuit and a first control circuit, which respectively electrically connects with the resistance. Each of the at least one second control unit comprises a second control circuit, which respectively connects with the resistance. The detecting circuit comprises a first power source, which generates a first current, to derive a maximum power value of the power source.

In one preferred embodiment, the detecting circuit, the first control circuit, and the second control circuit are electrically connected in parallel, and then are connected with the resistance.

In one preferred embodiment, the first control unit and the at least one second control unit are electrically connected in parallel, and then are connected with the resistance.

In one preferred embodiment, the first control circuit and the second control circuit respectively comprise a comparing circuit, which is used to compare a first voltage generated by the first current, to derive the maximum power value of the power source of the power supply controlling device and a value of the resistance.

In one preferred embodiment, the comparing circuit compares the first voltage with a first predetermined voltage value, to derive the value of the resistance and the maximum power value of the power source.

In one preferred embodiment, the first control circuit and the second control circuit respectively comprise a second power source, which generates a second current according to a comparative result of the comparing circuit.

In one preferred embodiment, the first control circuit and the second control circuit respectively comprise a comparing circuit, which is used to compare a second voltage generated by the second current, to derive a power consumption value of the power supply controlling device.

In one preferred embodiment, the power controlling module further comprises a plurality of converters, which are respectively used to supply power to the connecting ports corresponding to the control units.

In order to achieve the above objective, the present invention provides a power supply controlling device, which comprises a power source, a plurality of connecting ports, a plurality of converters, a plurality of control units, and a resistance.

The power source is used to provide power. The plurality of connecting ports connect with the power source to provide power to a plurality of electronic devices which are connected to the connecting ports. The plurality of converters receive power from the power source and are respectively used to supply power to the connecting ports which are corresponded to the control units. Each of the control units respectively connects with each of the connecting ports. The control units comprise a first control unit and at least one second control unit. The first control unit comprises a detecting circuit and a first control circuit, which respectively electrically connects with the resistance. Each of the at least one second control units comprises a second control circuit, which respectively connects with the resistance. The detecting circuit comprises a first power source, which generates a first current, to derive a maximum power value of the power source.

In one preferred embodiment, the detecting circuit, the first control circuit, and the second control circuit are electrically connected in parallel, and then are connected with the resistance.

In one preferred embodiment, the first control unit and the at least one second control unit are electrically connected in parallel, and then are connected with the resistance.

In one preferred embodiment, the first control circuit and the second control circuit respectively comprise a comparing circuit, which is used to compare a first voltage generated by the first current, to derive the maximum power value of the power source of the power supply controlling device and a value of the resistance.

In one preferred embodiment, the comparing circuit compares the first voltage with a first predetermined voltage value, to derive the value of the resistance and the maximum power value of the power source.

In one preferred embodiment, the first control circuit and the second control circuit respectively comprise a second power source, which generates a second current according to a comparative result of the comparing circuit.

In one preferred embodiment, the first control circuit and the second control circuit respectively comprise a comparing circuit, which is used to compare a second voltage generated by the second current, to derive a power consumption value of the power supply controlling device.

In order to achieve the above objective, the present invention provides a power supply controlling unit for a power supply controlling device. The power supply controlling device comprises a power source, a resistance, and a plurality of connecting ports. Each of the connecting ports corresponds with one of the power supply controlling units. The power supply controlling unit electrically connects with the power source, the resistance, and one of the connecting ports. The power supply controlling unit comprises a detecting circuit and a control circuit.

The detecting circuit comprises a first power source, which generates a first current, to derive a maximum power value of the power source. The control circuit comprises a comparing circuit, which is used to compare a first voltage generated by the first current, to derive a value of the resistance. The value of the resistance is setup by a maximum power value of the power source.

In one preferred embodiment, the first control circuit and the second control circuit respectively comprise a second power source, which generates a second current according to a comparative result of the comparing circuit.

In one preferred embodiment, the first control circuit and the second control circuit respectively comprise a comparing circuit, which is used to compare a second voltage generated by the second current, to derive a power consumption value of the power supply controlling device.

In order to achieve the above objective, the present invention provides a power supply controlling method for a power supply controlling device. The power supply controlling method comprises: first, a first power source of a detecting circuit of one of a plurality of control units outputs a first current to a ground terminal through a resistance, the control units are connected in parallel, then connecting with the resistance; then, a comparing circuit of a control circuit of the control units compares a first voltage generated by the first current with a first predetermined voltage value, to derive a maximum power value of the power source of the power supply controlling device and a value of the resistance.

In one preferred embodiment, the power supply controlling method further comprises: first, a second power source of the control circuit of each of the control units outputs a second current to the ground terminal through the resistance, according to a comparative result of the comparing circuit; then, the comparing circuit of the control circuit of each of the control units compares a second voltage generated by the second current with a second predetermined voltage value, to derive a power consumption value of the power supply controlling device.

In one preferred embodiment, the power supply controlling method further comprises: first, the comparing circuit of the control circuit of each of the control units calculates the maximum power value and the power consumption value, to derive an excess power value; then, a converter corresponding to each of the control units partially turns on the control unit while the excess power value is equal to or greater than a predetermined value or partially turns off the control unit while the excess power value is less than the predetermined value.

With comparison with the conventional art, the present invention can derive a maximum power value of the power supply controlling device and a single power consumption value of each of the control units by hardware means, rather than by software means, to directly and selectively stop/limit the power supply to partial of the control unit without calculation of software.

BRIEF DESCRIPTION OF THE DRAWINGS

FIG. 2 is a relationship drawing of the potential difference between two ends of the resistance and the corresponding resistance;

FIG. 3 is a relationship drawing of the maximum power value and the resistance;

FIG. 4 is a relationship drawing of output data and a current through the resistance;

FIG. 5 is a relationship drawing of the power consumption value and the potential difference between two ends of the resistance;

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

Figure 1:
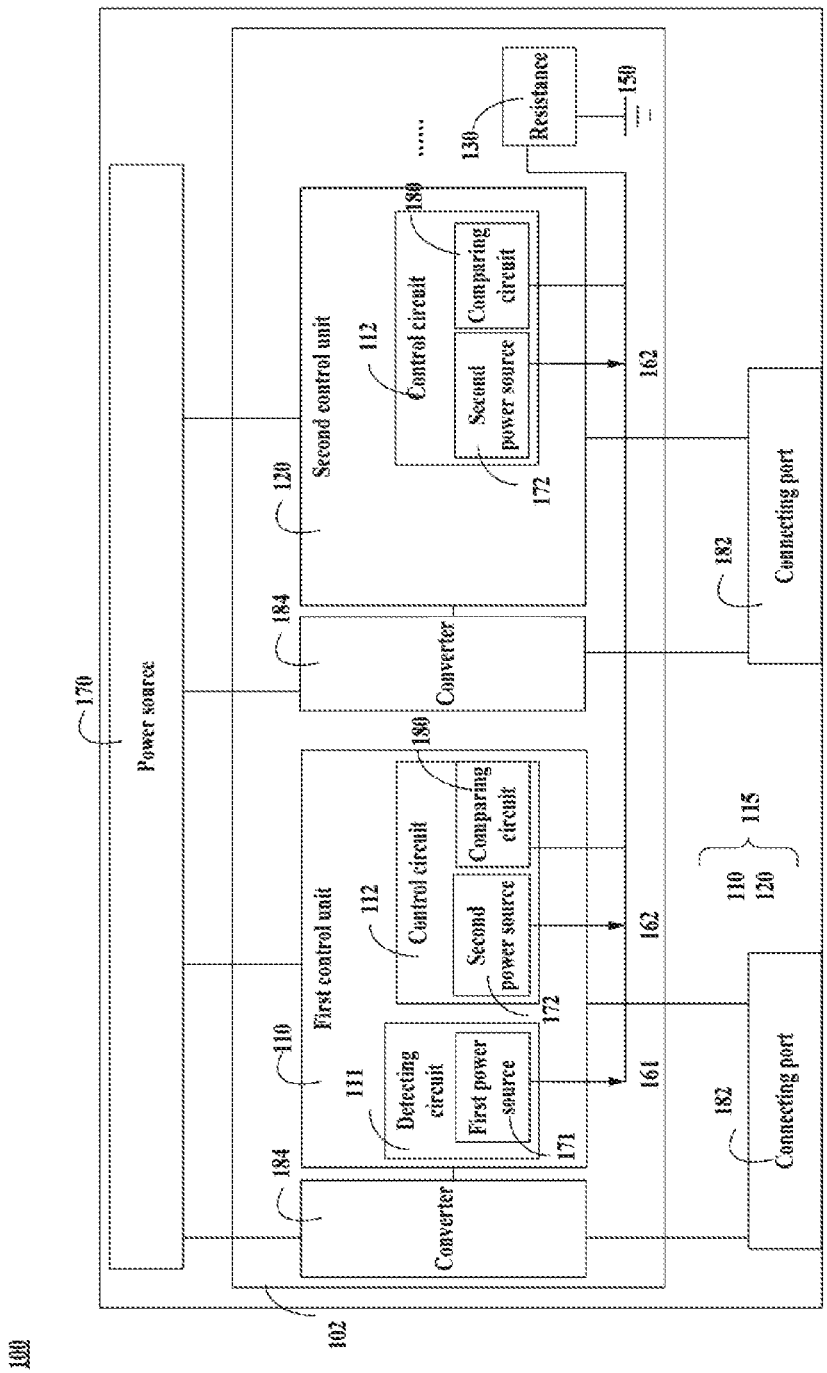
FIG. 1 is an illustrative drawing of a power supply controlling device according to a first preferred embodiment of the present invention.

FIG. 1 is an illustrative drawing of a power supply controlling device 100 according to a first preferred embodiment of the present invention. The power supply controlling device 100 comprises a power source 170, a plurality of connecting ports 182, a plurality of converters 184, and a power supply controlling module 102. The power supply controlling module 102 comprises a plurality of control units 115 and a resistance 130 (Rp).

The control units 115 are electrically connected in parallel, and then are connected with the resistance 130. Each of the control units 115 respectively connects with each of the connecting ports 182. The control units 115 comprise a first control unit 110 and at least one second control unit 120. In the preferred embodiment, the power supply controlling module 102 only has one first control unit 110, but multiple second control units 120. The first control unit 110 comprises a detecting circuit 111 and a first control circuit 112, which respectively electrically connects with the resistance 130. Each of the at least one second control units 120 comprises a second control circuit 112, which respectively connects with the resistance 130. The detecting circuit 111 comprises a first power source 171, which generates a first current 161, to derive a maximum power value of the power source 170.

The detecting circuit 111, the first control circuit 112, and the second control circuit 112 are electrically connected in parallel, then being connected with the resistance 130. The first control unit 110 and the at least one second control unit 120 are electrically connected in parallel, and then are connected with the resistance 130.

The detecting circuit 111 comprises the first power source 171, which generates a first current 161. The first control circuit 112 and the second control circuit 112 respectively comprise a comparing circuit 180, which is used to compare a first voltage generated by the first current 161, to derive the maximum power value of the power source 170 of the power supply controlling device 100 and a value of the resistance 130. For details, please refer to FIGS. 2-3 and the following description. The first control circuit 112 and the second control circuit 112 respectively comprise a second power source 172, which generates a second current 162 according to a comparative result of the comparing circuit 180. The comparing circuit 180 is used to compare a second voltage generated by the second current 162, to derive a power consumption value of the power supply controlling device 100. Furthermore, the first current 161 and the second current 162 will not exist at the same time. In detail, when the power supply controlling device 100 does not connect with any electronic device, the first power source 171 outputs the first current 161 to a ground terminal through the resistance 130. The comparing circuit 180 can derive the maximum power value (the maximum value with which the power supply controlling device 100 can provide). When the power supply controlling device 100 connects with electronic devices, the second power source 172 outputs the second current 162 to a ground terminal through the resistance 130 according to the power supply of different electronic devices. Then, the comparing circuit 180 compares a second voltage with a second predetermined voltage value, to derive the power consumption value (the power needs to be outputted by the power supply controlling device 100).

The potential difference generated by the first current 161 at two ends of the resistance 130 is $V_{Rp}$. Each control unit 115 is used to control a power supply of one connecting port. Perfectly, the first power source 171 is a stable power source with 3.3 volt. For the current and the power in a circuit are unable to be calculated directly, only the potential difference can be used directly. Hence, the present invention is able to directly broadcast the maximum power value (in a form of potential difference) of the power supply controlling device 100 at the power supply controlling device 100, to let the control units 115 all be aware of the maximum power value of the power supply controlling device 100.

The detecting circuit 111 is only disposed in the first control unit 110, the control circuit 112 is disposed in each of the control units 115. The second power source 172 outputs the second current 162 to the ground terminal 150 through the resistance 130. Each control unit 115 calculates the single power consumption value of each control unit 115 according to the second current 162 and the resistance 130. Each control unit 115 calculates an excess power value (power budget) according to the maximum power value and the single power consumption value. Perfectly, the detecting circuit 111 and the control circuit 112 has reversal conduction status, so it is possible to individually detect the maximum power value and the single power consumption value.

The converters 184 receive the power of the power source 170 and individually control the power supply of the connecting ports 182 corresponding to the control unit 115. The converters corresponding to the control units partially turn on the control unit 115 while the excess power value is equal to or greater than a predetermined value or partially turn off the control unit 115 while the excess power value is less than the predetermined value. In detail, supply power can divide into normal power supply (according to the power request of the electronic device) and limiting power supply (lower than the power request of the electronic device).

FIG. 2 is a relationship drawing of the potential difference between two ends of the resistance and the corresponding resistance. When the $V_{Rp}$ is between 1.5-2.5 volts, it means the resistance value is 200 k ohm; when the $V_{Rp}$ is between 0.75-1.5 volts, it means the resistance value is 100 k ohm; when the $V_{Rp}$ is between 0.375-0.75 volts, it means the resistance value is 50 k ohm; when the $V_{Rp}$ is between 0.125-0.375 volts, it means the resistance value is 25 k ohm. When the $V_{Rp}$ is greater than 2.5 volts, the circuit is an open circuit, power supply to the power supply controlling device 100 is stopped; when the $V_{Rp}$ is less than 0.125 volts, the circuit is a short circuit, power supply to the power supply controlling device 100 is stopped. In real operation, the comparing circuit 180 compares the $V_{Rp}$ and the first predetermined voltage value, to make the whole circuit know the value of the resistance 130. The value of the resistance 130 is designed by the maximum power value of the power source 170, hence, the maximum power value of the power source 170 is known by deriving the value of the resistance 130. In other words, in this stage, the first predetermined voltage value is between 0.125-2.5 volts, with loop calculation of the comparing circuit 180, to know the value of the resistance 130 with which the $V_{Rp}$ corresponds. The relationship between the volt ranges and the corresponding resistance values of the preferred embodiment can be changed according to different requests, and is not limited to this preferred embodiment.

FIG. 3 is a relationship drawing of the maximum power value and the resistance. According to the design of the present invention, with the change of the maximum power value (24-60 watts), different resistance 130 is chosen (200 k-25 k ohms). Based on different design, different resistances can be chosen. For example, when the maximum power value is 24 watts, the resistance is setup by 200 k ohm, which is shown in a circuit as: the first current 161 is 0.1 µA, the $V_{Rp}$ is equal to 2 volts (V=IR), in other words, when the $V_{Rp}$ is equal to 2 volts, it means the power value is 24 watts. In real operation, the value of the resistance 130 is designed by the maximum power value of the power source 170, hence, the maximum power value of the power source 170 is derived by knowing the value of the resistance 130. The relationship between the maximum power value and the corresponding resistance values of the preferred embodiment can be changed according to different requests, and is not limited to this preferred embodiment.

Please refer to FIGS. 4-5. FIG. 4 is a relationship drawing of output data and a current through the resistance. FIG. 5 is a relationship drawing of the power consumption value and the potential difference between two ends of the resistance. The $V_{Rp}$ means the potential difference between two ends of the resistance 130. The output data comprises voltages of the connecting ports (VBUS), outputting current of the connecting ports, and outputting power. For example, when an electronic device needs 12 or 20 volts, if the resistance is 200 k ohm, the second power source 172 of the control unit 115 connecting with the electronic device outputs the second current 162 with 5 µA; if the resistance is 25 k ohm, the control unit 115 connecting with the electronic device outputs the second current 162 with 40 µA. In real operation, the second power source 172 generates a second current 162 according to a comparative result of the comparing circuit 180 (see above description).

In one embodiment, the present invention divides 0-60 watts into 10 output voltages, with different designs, it is possible to have different quantities of output voltages. In the preferred embodiment, when the circuit detects the $V_{Rp}$ is equal to 2.5 volt, with the formula: power consumption value=$(V_{Rp})*24$, the single power consumption value is known as 60 watts. Hence, in the circuit of the present invention, the control units 115 of the circuit all can know one of the single power consumption values by the $V_{Rp}$. In other preferred embodiment, if the single power consumption value is needed to know when the $V_{Rp}$ is equal to 0.125 volts, the single power consumption value can be derived as 3 volts by level-by-level comparison with multiple comparators. Hence, the present invention is able to directly broadcast the maximum power value (in a form of potential difference) of the power supply controlling device 100 at the power supply controlling device 100, to let the control units 115 all be aware of the maximum power value of the power supply controlling device 100. In real operation, the comparing circuit 180 compares the second voltage generated by the second current 162, to derive a power consumption value of the power supply controlling device 100.

In real operation, based on the voltage requested by the electronic device (such as 12 or 20 volts) and the value of the resistance 130 derived before (such as 200 k ohm), with FIG. 4, it is known that the second current 162 outputted from the second power source 172 is 5 µA. Then, the $V_{Rp}$ is derived as 1 volt according to the second current 162 (5 µA) and the resistance 130 (200 k ohm), then, the power consumption value is known as 24 watts according to the FIG. 5. The relationship between the second current 162 and the corresponding resistance values of the preferred embodiment can be changed according to different requests, and is not limited to this preferred embodiment. The relationship between the $V_{Rp}$ and the power consumption values of the preferred embodiment can be changed according to different requests, and is not limit to this preferred embodiment.

Please refer to FIGS. 3-5, for example, when the connecting ports do not connect with any electronic device, the first power source 171 outputs the first current 161 (10 µA), $V_{Rp}$ is equal to 1.25 volts, the resistance 130 is equal to 100 k ohm, then the maximum power value of the power supply controlling device 100 is 36 watts, the control units 115 knows the maximum power value by voltage means (1.25 volts).

First, after an electronic device (needs 5 volts) is connected to the left most connecting port, with reference of FIG. 3 (iSRC, resistance=100 k ohm), it is known that the second power source 172 outputs a second current 162 (5 µA), which means the power consumption value (power needed to be outputted) of the power supply controlling device 100 is 12 watts. However, according to FIG. 5, the control units 115 know the maximum power value by voltage means (0.5 volts). Hence, the excess power value of the power supply controlling device 100 is 24 watts (36−12=24); the rest of the connecting ports can normally connect with other electronic devices.

Then, after an electronic device (needs 9 volts) is connected to the other connecting ports, with reference to FIG. 3 (iSRC, resistance=100 k ohm), it is known that the second power source 172 outputs a second current 162 (7.5 µA), which means the power consumption value (power needed to be outputted) of the power supply controlling device 100 is 18 watts. With the 12 watts for the previous electronic device, the power consumption value (power needed to be outputted) of the power supply controlling device 100 is 30 watts (18+12=30). However, according to FIG. 5, the control units 115 know the maximum power value by voltage means (1.25 volts). Hence, the excess power value of the power supply controlling device 100 is 24 watts (36−30=6), the rest connecting ports 182 will stop supplying power to electronic devices needing more than 5 volts (such as type-C 3.0 A, Auto 2.4 A). In the preferred embodiment, when the excess power value of the power supply controlling device 100 is 12 watts, the rest connecting ports 182 will stop supplying power to electronic devices needing more than 5 volts (such as QC3.0, PE+2.0, SFCP, HFCP); when the excess power value of the power supply controlling device 100 is 0 or 6 watts, the rest connecting ports 182 will stop supplying power to electronic devices needing more than 5 volts (such as type-C 3.0 A, Auto 2.4 A); when the excess power value of the power supply controlling device 100 is less than 0 watts, the rest connecting ports 182 will stop to supply power to all electronic devices.

In another example, there are several situations while the maximum power value of the power supply controlling device 100 is 24 volts.

In the first situation, an electronic device (needs 12 volts) is connected with the first port (left most), the excess power value of the power supply controlling device 100 is 0 watts (24−24=0). The power supply controlling device 100 will stop supplying power to electronic devices needing more than 5 volts (such as type-C 3.0 A, Auto 2.4 A) and limit the electronic devices which continuingly connect with the power supply controlling device 100 with charging ability of only 7.5 watts (5 volts, 1.5 amps).

In the second situation, an electronic device (needs 9 volts) is connected with the first port (left most), the excess power value of the power supply controlling device 100 is 6 watts (24−18=6). The power supply controlling device 100 will stop supplying power to electronic devices needing more than 5 volts (such as type-C 3.0 A, Auto 2.4 A) and limit the electronic devices which continuingly connect with the power supply controlling device 100 with charging ability of only 7.5 watts (5 volts, 1.5 amps).

In the third situation, an electronic device (needs 5 volts) is connected with the first port (left most), the excess power value of the power supply controlling device 100 is 12 watts (24−12=12). The power supply controlling device 100 will stop supplying power to electronic devices needing more than 5 volts (such as type-C 3.0 A, Auto 2.4 A) and limit the electronic devices which continuingly connect with the power supply controlling device 100 with charging ability of only 15 watts (5 volts, 3.0 amps).

Figure 6:
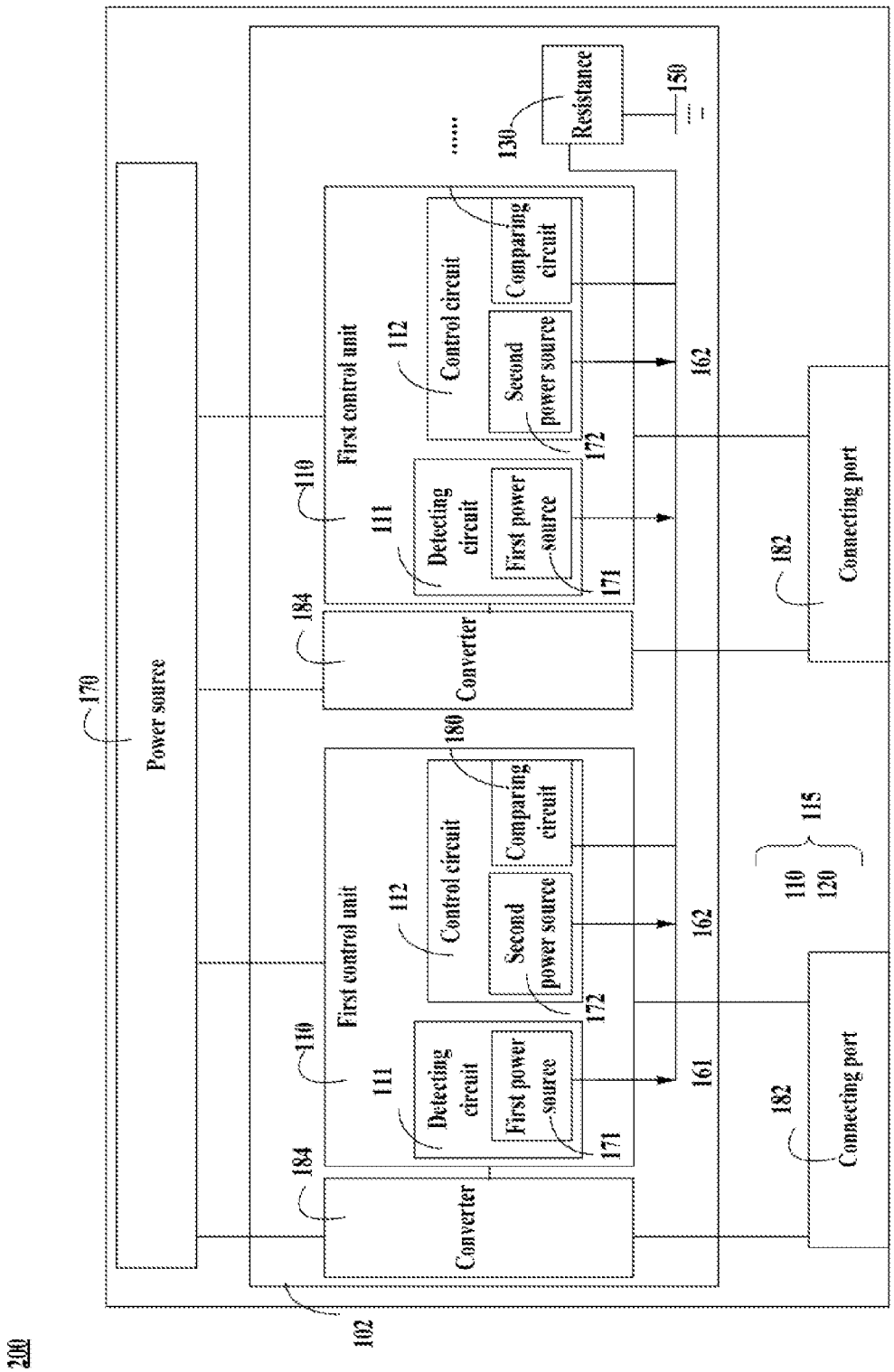
FIG. 6 is an illustrative drawing of a power supply controlling device according to a second preferred embodiment of the present invention.

FIG. 6 is an illustrative drawing of a power supply controlling device 200 according to a second preferred embodiment of the present invention. The difference between the second preferred embodiment and the first preferred embodiment is: the at least one second control unit 120 is replaced by multiple first control units 110. In real operation, the control circuit 112 of only one of the first control unit 110 is connected with the resistance 130. In the first preferred embodiment, there are two control units (first control unit 110 and the second control unit 120) needing to be produced; however, the benefit of the second preferred embodiment is to unify the production of control unit (first control unit 110), and then the manufacturing cost is reduced accordingly.

Figure 7:
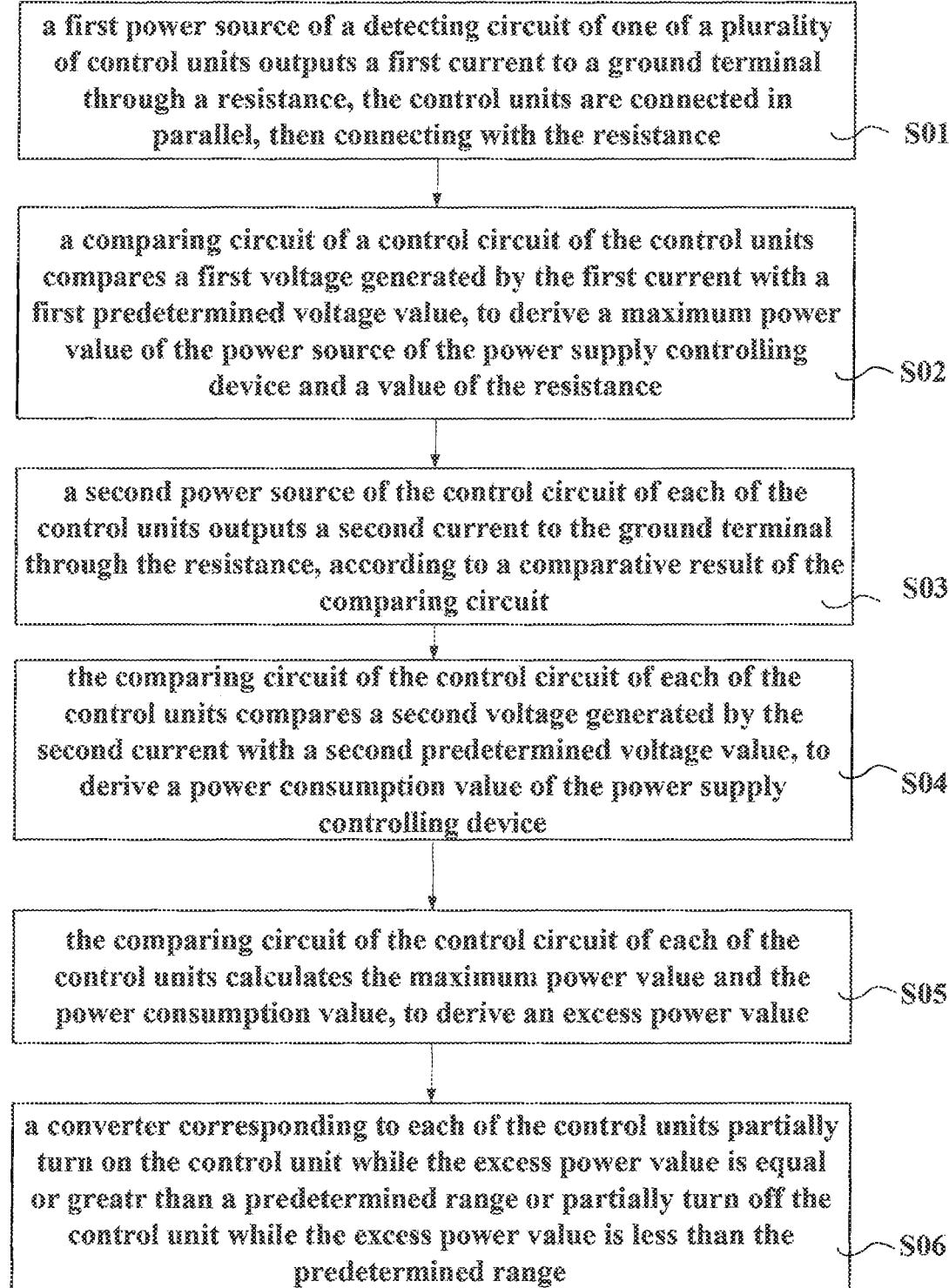
FIG. 7 is a flow diagram of a controlling method of the power supply controlling device according to the present invention.

FIG. 7 is a flow diagram of a controlling method of the power supply controlling device according to the present invention (please refer to the numerals of FIG. 6). First, proceeding a step S01, a first power source 171 of a detecting circuit 111 of one of a plurality of control units 115 outputs a first current 161 to a ground terminal 150 through a resistance 130, the control units 115 are connected in parallel, then connecting with the resistance 130; then, proceeding a step S02, a comparing circuit 180 of a control circuit 112 of the control units 115 compares a first voltage generated by the first current 161 with a first predetermined voltage value, to derive a maximum power value of the power source 170 of the power supply controlling device 200 and a value of the resistance; then, proceeding a step S03, a second power source 172 of the control circuit 112 of each of the control units 115 outputs a second current 162 to the ground terminal 150 through the resistance 130, according to a comparative result of the comparing circuit 180; then, proceeding a step S04, the comparing circuit 180 of the control circuit 112 of each of the control units 115 compares a second voltage generated by the second current 162 with a second predetermined voltage value, to derive a power consumption value of the power supply controlling device 200; then, proceeding a step S05, the comparing circuit 180 of the control circuit 112 of each of the control units 115 calculates the maximum power value and the power consumption value, to derive an excess power value; then, proceeding a step S06, a converter 184 corresponding to each of the control units 115 partially turns on the control units 115 while the excess power value is equal to or greater than a predetermined value or partially turns off the control units 115 while the excess power value is less than the predetermined value. Preferably, the predetermined value can be one of 0, 6, and 12 volts.

Although the present invention has been disclosed as preferred embodiments, the scope of the claims of the present invention must be defined. The foregoing preferred embodiments are not intended to limit the present invention.

What is claimed is:

1. A power supply controlling module for a power supply controlling device, wherein the power supply controlling device comprises a power source and a plurality of connecting ports, the power supply controlling module comprising:
a plurality of control units, each of the control units respectively connecting with each of the connecting ports and controlling power supply from the power source to respective connecting ports, wherein the control units comprise a first control unit and at least one second control unit electrically connected in parallel; and
a resistance, electrically connecting with the first control unit and the at least one second control unit;
wherein the first control unit comprises a detecting circuit and a first control circuit, which respectively electrically connect with the resistance, each of the at least one second control unit comprises a second control circuit, which respectively connects with the resistance, and the detecting circuit comprises a first power source, which generates a first current, wherein the first control circuit and the second control circuit respectively comprise a comparing circuit and a second power source, and control the second power source to generate a second current based on a value of the resistance and a respective individual power consumption requirement at the corresponding connecting port; and
wherein the comparing circuit is configured to:
detect a first voltage across the resistance while the first current is applied through the resistance;
compare the first voltage with a first predetermined voltage value to acquire the value of the resistance;
acquire a maximum power value that the power source is capable of providing based on the value of the resistance;
detect a second voltage across the resistance while the second current is applied through the resistance; and
compare the second voltage with a second predetermined voltage value to acquire a power consumption value required by respective connecting ports.

2. The power supply controlling module according to claim 1, wherein the detecting circuit, the first control circuit, and the second control circuit are electrically connected in parallel, and are connected with the resistance.

3. The power supply controlling module according to claim 1, further comprising a plurality of converters connecting the power source and respective control units, wherein the plurality of converters are configured to convert AC power from the power source to DC power and respectively supply the DC power to the connecting ports corresponding to the control units.

4. A power supply controlling device, comprising:
a power source, being used to provide power;
a plurality of connecting ports, connecting with the power source, to provide power to a plurality of electronic devices which are connected to the connecting ports;
a plurality of converters, converting AC power from the power source to DC power and supplying the DC power to the plurality of connecting ports;
a plurality of control units, each of the control units respectively connecting each of the converters and each of the connecting ports and controlling power supply from the power source to respective connecting ports, wherein the control units comprise a first control unit and at least one second control unit electrically connected in parallel; and
a resistance, electrically connecting with the first control unit and the at least one second control unit;
wherein the first control unit comprises a detecting circuit and a first control circuit, which respectively electrically connect with the resistance, each of the at least one second control unit comprises a second control circuit, which respectively connects with the resistance, the detecting circuit comprises a first power source, which generates a first current, wherein the first control circuit and the second control circuit respectively comprise a comparing circuit and a second power source, and control the second power source to generate a second current based on a value of the resistance and a respective individual power consumption requirement at the corresponding connecting port; and
wherein the comparing circuit is configured to:
detect a first voltage across the resistance while the first current is applied through the resistance;
compare the first voltage with a first predetermined voltage value to acquire the value of the resistance;

acquire a maximum power value that the power source is capable of providing based on the value of the resistance;

detect a second voltage across the resistance while the second current is applied through the resistance; and compare the second voltage with a second predetermined voltage value to acquire a power consumption value required by respective connecting ports.

5. The power supply controlling device according to claim 4, wherein the detecting circuit, the first control circuit, and the second control circuit are electrically connected in parallel, and then being connected with the resistance.

6. A power supply controlling method, for a power supply controlling device comprising a power source, a resistance, at least one connecting port, a plurality of converters, and a plurality of control units connected in parallel and connected with the resistance, the plurality of control units comprising a detecting circuit and at least one control circuit, the detecting circuit comprising a first power source, the at least one control circuit comprising a comparing circuit and a second power source, the power supply controlling method comprising:

outputting, by the first power source, a first current to a ground terminal through the resistance in order to generate a first voltage across the resistance;

comparing, by the comparing circuit, the first voltage with a first predetermined voltage value to derive a value of the resistance; and deriving a maximum power value that the power source is capable of providing based on the value of the resistance;

outputting, by the second power source, a second current to the ground terminal through the resistance based on the value of the resistance and a power consumption requirement at the at least one connecting port in order to generate a second voltage across the resistance; and comparing, by the comparing circuit, the second voltage with a second predetermined voltage value to derive a power consumption value required by the at least one connecting port.

7. The power supply controlling method according to claim 6, further comprising:

calculating an excess power value that is a difference between the maximum power value and the power consumption value by the comparing circuit; and turning on a part of the control units by the plurality of converters while the excess power value is equal to or greater than a predetermined value, or turning off the control units by the plurality of converters while the excess power value is less than the predetermined value.

* * * * *